United States Patent
Beaucoup et al.

(10) Patent No.: US 7,221,755 B2
(45) Date of Patent: May 22, 2007

(54) METHOD OF CAPTURING CONSTANT ECHO PATH INFORMATION IN A FULL DUPLEX SPEAKERPHONE

(75) Inventors: Franck Beaucoup, Donrobin (CA); Michael Tetelbaum, Ottawa (CA)

(73) Assignee: Mitel Networks Corporation, Ottawa, ON (CA)

( * ) Notice: Subject to any disclaimer, the term of this patent is extended or adjusted under 35 U.S.C. 154(b) by 0 days.

(21) Appl. No.: 10/321,499

(22) Filed: Dec. 18, 2002

(65) Prior Publication Data

US 2004/0120511 A1 Jun. 24, 2004

(51) Int. Cl.
*H04M 9/08* (2006.01)
(52) U.S. Cl. ................ 379/406.05; 379/406.1
(58) Field of Classification Search .......... 379/406, 379/410
See application file for complete search history.

(56) References Cited

U.S. PATENT DOCUMENTS

| | | | |
|---|---|---|---|
| 5,838,787 A | 11/1998 | Ding et al. | |
| 6,049,607 A * | 4/2000 | Marash et al. | 379/406.08 |
| 6,212,273 B1 * | 4/2001 | Hemkumar et al. | 379/406.08 |
| 6,226,380 B1 | 5/2001 | Ding | |
| 6,510,225 B1 * | 1/2003 | Robertson et al. | 379/406.1 |
| 6,516,063 B1 * | 2/2003 | Farrell et al. | 379/406.08 |

FOREIGN PATENT DOCUMENTS

CA 2 291 428 2/2000

* cited by examiner

*Primary Examiner*—Sinh Tran
*Assistant Examiner*—Walter F Briney, III
(74) *Attorney, Agent, or Firm*—Antonelli, Terry, Stout & Kraus, LLP.

(57) ABSTRACT

A method of improving convergence of an echo canceller in a full duplex speakerphone, wherein the echo canceller includes LEC (Line Echo Canceller) and AEC (Acoustic Echo Canceller) portions, comprising the steps of capturing coefficients during operation, storing the coefficients, and utilizing the stored coefficients as default values during start-up of a subsequent call. According to the method of the present invention, the amount of echo cancellation necessary to provoke a save of the coefficients decreases with time when it is not achieved by the system despite the presence of a reference signal (i.e. speakerphone signal).

21 Claims, 3 Drawing Sheets

METHOD OF CAPTURING CONSTANT ECHO PATH INFORMATION IN A FULL DUPLEX SPEAKERPHONE

FIELD OF THE INVENTION

The present invention relates in general to speakerphones and more particularly to a method of capturing constant echo path information in a full duplex handsfree (FDHD) speakerphone.

BACKGROUND OF THE INVENTION

One of the most important performance indicators for full duplex speakerphones is convergence time (i.e. the time required by the echo cancellers within the speakerphone to reach an acceptable level of cancellation). The convergence time of the speakerphone depends both on internal Line Echo Canceller (LEC) and Acoustic Echo Canceller (AEC) convergence times. In order to converge quickly and properly, a speakerphone echo canceller requires a reference signal with correct stochastic properties. At the beginning of a call (Start-up), the reference signal is usually not sufficiently stochastic (e.g. the line signal typically comprises narrow band tones such as dial tone) or speech is not present, so that echo cancellation is unable to commence immediately. In such situations the speakerphone loop may remain unstable for a noticeable period of time. This can result in feedback or "howling" of the speakerphone during start-up, especially when the speaker volume is high.

In order to prevent such feedback, it is an objective of speakerphone design to ensure that the echo cancellers (LEC and AEC) converge rapidly to the correct echo path models at start-up. Otherwise, the speaker volumes must be reduced during start-up, which may be annoying to a user.

According to one prior art approach to reducing the problem of feedback during speakerphone start-up, howling detection has been used (see ITU-T Recommendation G.168) in combination with gain control. According to this approach, the speaker volume (or loop gain) is reduced when howling is detected. A drawback of this approach is that the gain switching is often audible which may be annoying to the user.

Another prior art solution involves operating the speakerphone in a half duplex mode on start-up in order to prevent howling and echo from interfering with communication. The speakerphone remains in the half-duplex mode until the LEC adapts sufficiently to ensure echo cancellation. A drawback of this approach is that the speakerphone sometimes stays in the half-duplex mode for a long time, making communication between telephone parties difficult or impossible.

Yet another prior art solution involves forcing the speakerphone to start operation at a predetermined "acceptable" low volume level which guarantees stability in the audio loop, and then gradually increasing the volume as convergence of the echo canceller is achieved. A drawback of this approach is that the volume adjustment is often noticeable to the user.

Since the LEC models a network echo path where the first echo reflection of the near end hybrid is usually reasonably constant for each connection, and the AEC models an acoustic echo path where direct acoustic coupling or coupling through the plastic housing of the phone is always the same for a given phone, both the LEC and AEC may be loaded initially with previously captured and saved constant echo path models represented by default coefficients, and then continue to converge toward the complete echo channel models. This results in faster convergence time, and more stability as the main, strongest echo reflections will already be cancelled using the default coefficient models.

Thus, according to copending Patent Canadian Patent Application No. 2,291,428, a method is provided for improving the start-up convergence time of the LEC filter, thereby resulting in a total reduced convergence time for the speakerphone. This method is based on capturing the LEC coefficients once the LEC has converged, and saving them as the default coefficients for the next call. As a result, the echo-canceling algorithm does not have to wait for a suitable reference signal to commence convergence. At start-up, the echo canceller immediately begins canceling the line echo, based on the previously stored LEC coefficients, thereby assisting the AEC algorithm by eliminating residual line echo from the acoustic signal which the AEC algorithm is required to converge to, and initially making the speakerphone loop more stable. As indicated above, the same principal may also be applied to the AEC for direct acoustic coupling or coupling through the speakerphone housing plastic, which is always the same for a given phone. The default coefficients in this case represent the constant acoustic echo path from loudspeaker to microphone and may be reused for each new call. At start-up, the AEC immediately starts canceling the echo caused by direct acoustic coupling, while converging toward the complete acoustic echo path model that represents the combination of direct coupling and the specific room echo response.

The principle of saving default coefficients may also be applied to multiple loudspeaker-to-microphone echo paths for multiple-microphone directional systems, or even loudspeaker-to-beam echo paths for beamforming-based systems that perform echo cancellation on the output signal of a beamformer. In these cases, default coefficients can be reused from one instance of the AEC to the next in each different direction (e.g. angular sectors).

In order for such systems to work properly, the coefficients must be saved at appropriate times. If they are saved at arbitrary instants (e.g. at the end of a call), then there is a risk that the full-duplex echo cancellation algorithm will not be in a well-converged state at the instant of saving the coefficients. For example, the echo cancellation algorithm may be in the process of adapting to an echo path change related to the user moving his/her hand towards the telephone to press a button for ending the call. Saving the default coefficients in this case and reusing them at a later stage (e.g. for the next call) may result in poor echo canceller performance until it re-converges to a set of "good" coefficients.

As indicated above, the system set forth in Canadian Patent Application No. 2,291,428 tracks the degree of convergence of the full-duplex algorithm, and saves the default coefficients each time the convergence reaches a predetermined level. In one embodiment, the amount of echo actually cancelled by the algorithm is measured, and the coefficients are saved each time this amount increases by 3 dB from the previous save. One problem with this method is that if the full-duplex algorithm is subjected to narrow-band signals (e.g. in-band tones that are not detected fast enough), then it may reach excellent levels of convergence with coefficients that are very different from the useful wide-band echo-path coefficients. In such situations the system may never reach such a good level of convergence again with a wide-band signal, such that proper coefficients are never captured. This may result in annoying echo bursts for the far-end user each time these coefficients are used (for instance, at the beginning of each subsequent call). Another problem is that if the telephone is moved to a different location on a desk, where the direct echo path is more difficult to adapt to, then it may never be able to capture coefficients corresponding to its new location. It may therefore constantly reuse coefficients that do not correspond to those characterizing the real echo path, resulting in mediocre echo cancellation until the algorithm has a chance to re-converge to the real echo path.

SUMMARY OF THE INVENTION

According to the present invention, a method is provided for determining when to save coefficients so as to ensure that the system always captures coefficients that correspond to the best possible echo cancellation in its current condition, and to recover from scenarios where 'bad' default coefficients are captured. Thus, the saving of coefficients occurs at varying times depending on the amount of echo removed by the echo canceller (EC).

More particularly, the capture of coefficients is triggered when the amount of echo cancellation provided by the EC exceeds a certain threshold, where the value of the threshold varies with time. The threshold is increased by a certain amount each time the capture is triggered, and it is decreased by a certain amount when the capture is not triggered despite the presence of speech on the EC reference signal.

BRIEF DESCRIPTION OF THE DRAWINGS

A detailed description of the prior art and of a preferred embodiment of the invention is provided herein below with reference to the following drawings, in which.

DETAILED DESCRIPTION OF PRIOR ART AND PREFERRED EMBODIMENT

As discussed briefly above, a speakerphone echo canceller (EC) comprises two adaptive filters that attempt to converge to two different echo models (acoustic and network echo) at the same time. As a result, speakerphones can easily become unstable, especially during start-up.

Figure 1:
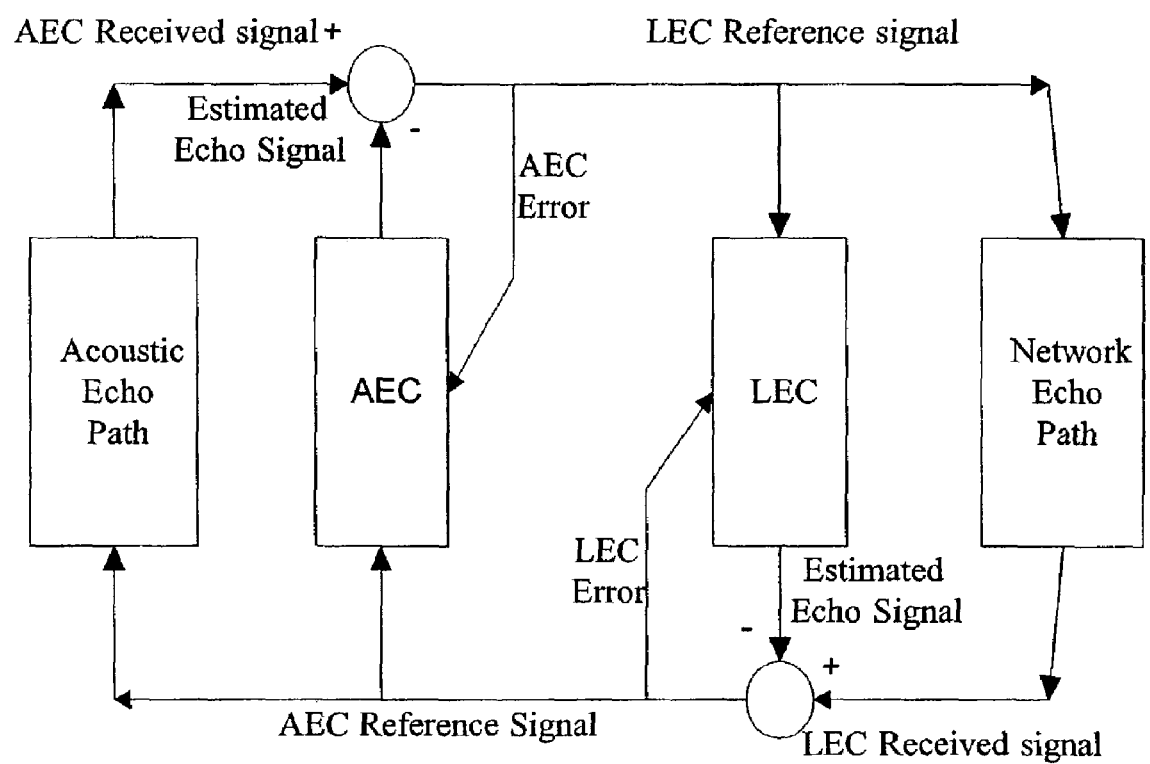
FIG. 1 is a block diagram of a prior art speakerphone echo canceller structure.

A traditional speakerphone echo canceller is shown in FIG. 1, wherein essential speakerphone components that are not related to echo cancellation have been omitted for clarity (e.g. double talk detector, non-linear processor, etc.) and are not addressed herein since they are not germane to the invention. The echo canceller attempts to model the transfer function of the echo path by means of an LEC filter and an AEC filter. The received signal (line or acoustic) is applied to the input of each filter (LEC and AEC) and to the associated echo path (network or acoustic) such that the estimated echo can be canceled by simply subtracting the signal which passes through each echo canceller from the received signal. If the transfer function of the model of the echo path is exactly the same as the transfer function of the echo path, the echo signal component is completely canceled (i.e. the error signal will be zero). The error signal is used for adaptation, so that the echo canceller converges to the correct transfer function, as discussed briefly above.

Typically, an algorithm such as the NLMS (Normalized-Least-Mean-Squared) algorithm is used to approximate the echo path (see "C261 (UNIC) DSP Re-engineering and Performance Report" Mitel Semiconductor, Document No. C261AP13, Oct. 21, 1996).

From FIG. 1 it will be appreciated that the residual echo after imperfect cancellation by the LEC will pass to the AEC reference signal. Since this residual echo is not correlated to the AEC received signal, this can cause the AEC filter to diverge. The extent to which AEC filter diverges depends on the level of the residual line echo. If the line echo is sufficiently canceled, its effect on the AEC behavior will be negligible.

Echo Return Loss Enhancement (ERLE) is an indicator of the amount of echo removed by an echo canceller. The ERLE is defined as:

$$ERLE(dB) = 10\log_{10}[Power(ReceivedSignal)/Power(ErrorSignal)];$$

A generally acceptable LEC convergence time requires that the echo canceller achieve 27 dB of ERLE in 0.5 sec (in ideal conditions).

Since the telephone is always connected to the same local loop (i.e. to the near-end Central Office (CO) or PBX), the impedance of the local loop remains the same for each call and consequently the near-end echoes remain fairly constant, from call to call. Accordingly, the local loop echo coefficients can be stored and re-used from call to call, thereby improving the start-up ERLE of the LEC. Furthermore, since the direct acoustic coupling through the plastic from loudspeaker to microphone is constant for given phone, the coefficients representing this part of the acoustic echo path can also be stored and re-used from call to call or when the look direction is changed in a directional speakerphone system, thereby improving the start-up ERLE of the AEC.

Figure 2:
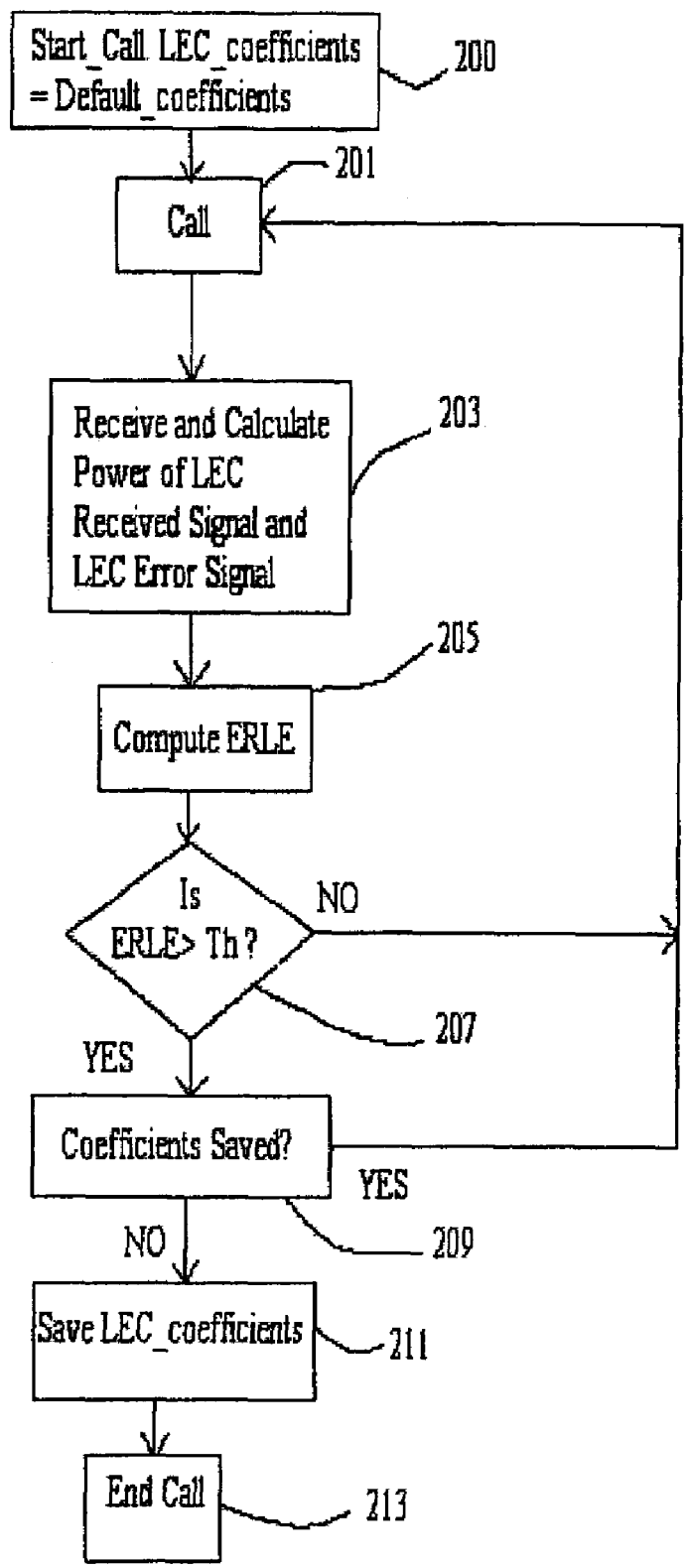
FIG. 2 is a flow chart showing the steps of the echo cancellation method according to the prior art.

Thus, with reference to the flowchart of FIG. 2, which shows operation of the method set forth in Canadian Patent Application No. 2,291,428, after start-up of the echo canceller (Step 200), any previously stored default LEC coefficients are loaded into the LEC. Although Canadian Patent Application No. 2,291,428 refers only to default coefficients being saved for the LEC, as indicated above the same principles apply to the AEC coefficients. Thus, the LEC (and/or AEC) begin(s) convergence using the well known NLMS algorithm (or other). On initial power-up of the speakerphone (i.e. prior to placing the first call), the initial coefficients are zero. Thus, the first call after power-up will always be a "training" call that results in capturing a suitable set of default coefficients for future calls. Next, at step 201, the "Call" proceeds. Signal levels of the LEC (and/or AEC) received signal and error signal are detected (step 203) and the ERLE is calculated using the formula set forth above (step 205). When a predetermined ERLE threshold level (Th) is reached (e.g. at least 24 dB of echo is canceled), as calculated at step 207, and provided that the best LEC (and/or AEC) coefficients have not been previously saved during the call-in-progress (step 209), then the LEC (and/or AEC) coefficients of the (near) constant echo path are saved (step 211). Convergence of the LEC (and/or AEC) then proceeds as per usual and the call is completed (step 213). Once saved, the default coefficients are not recalculated again for the duration of the call (i.e. a YES decision at step 209). However, the LEC (and/or AEC) default coefficients will be calculated once per each call to ensure the best default set is captured for the next call.

At start-up of the next call, the previously stored LEC (and/or AEC) coefficients are retrieved and used as the default coefficient set for the LEC (and/or AEC) (step 200), instead of starting from zero.

The following pseudo code illustrates the principles of the above method in greater detail, wherein "EC" is used to indicate both the LEC and AEC:

```
Power-up: Default_coefficients = [000...0];
Start_Call: EC_coefficients = Default_coefficients;
    Call:
        Execute EC algorithm;
        Calculate power level of received signal ;
        Calculate power level of error signal;
        If (ERLE > Threshold) AND (Best default set not saved)
            Save near echo coefficients
        If Not(End of the Call) Go to Call;
        If New Call Go to Start_Call;
```

Thus, each call subsequent to the initial power-up "training" call is provided with default coefficients that model the network and acoustic echo paths and guarantee small LEC and AEC error. This improves the training and tracking characteristic of the Full Duplex Handsfree Speakerphone (FDHF) and eliminates feedback during start-up. The best results are achieved when the training call uses a handset since there is no AEC-LEC loop instability and the LEC and AEC can therefore converge quickly.

According to the present invention, and in contrast with the prior method set forth in Canadian Patent Application No. 2,291,428, instead of fixing the threshold ERLE at a value of 24 dB, the "Threshold" value is varied to provide optimum performance for any particular application. As discussed in greater detail below, the "Threshold" value is increased by a factor, denoted herein as ERLE_THRESHOLD_FACTOR_UP, each time a capture is triggered, and decreased by another amount, denoted herein as ERLE_THRESHOLD_FACTOR_DOWN, when the capture is not triggered even though speech is present in the reference signal. The following pseudo code, in combination with FIG. 3, illustrates the principle of the present invention:

```
Power-up: Default_coefficients = [000...0];
Start_Call: EC_coefficients = Default_coefficients;
    Call:
        Execute EC algorithm;
        Calculate power level of received signal ;
        Calculate power level of error signal;
        If (ERLE > Threshold)
            Save near echo coefficients
            Increase Threshold
        Else if Voice present on EC reference signal
            If Threshold > THRESHOLD_MIN
                Decrease Threshold
        If Not(End of the Call) Go to Call;
        If New Call Go to Start_Call;
```

It should be noted that with the method set forth above, the capture of echo coefficients might be triggered several times within the same call. The rationale behind increasing the threshold with each capture is to try and capture the coefficients corresponding to the best possible cancellation performance of the algorithm in the given system. The rationale behind decreasing the threshold when the capture is not triggered, even though there is speech activity in the reference signal, is to avoid getting "stuck" with bad coefficients captured as a result of a faulty scenario (for instance on a narrow-band signal like a tone). A minimum value of the threshold is defined to avoid capturing coefficients below a certain level of echo cancellation.

Figure 3:
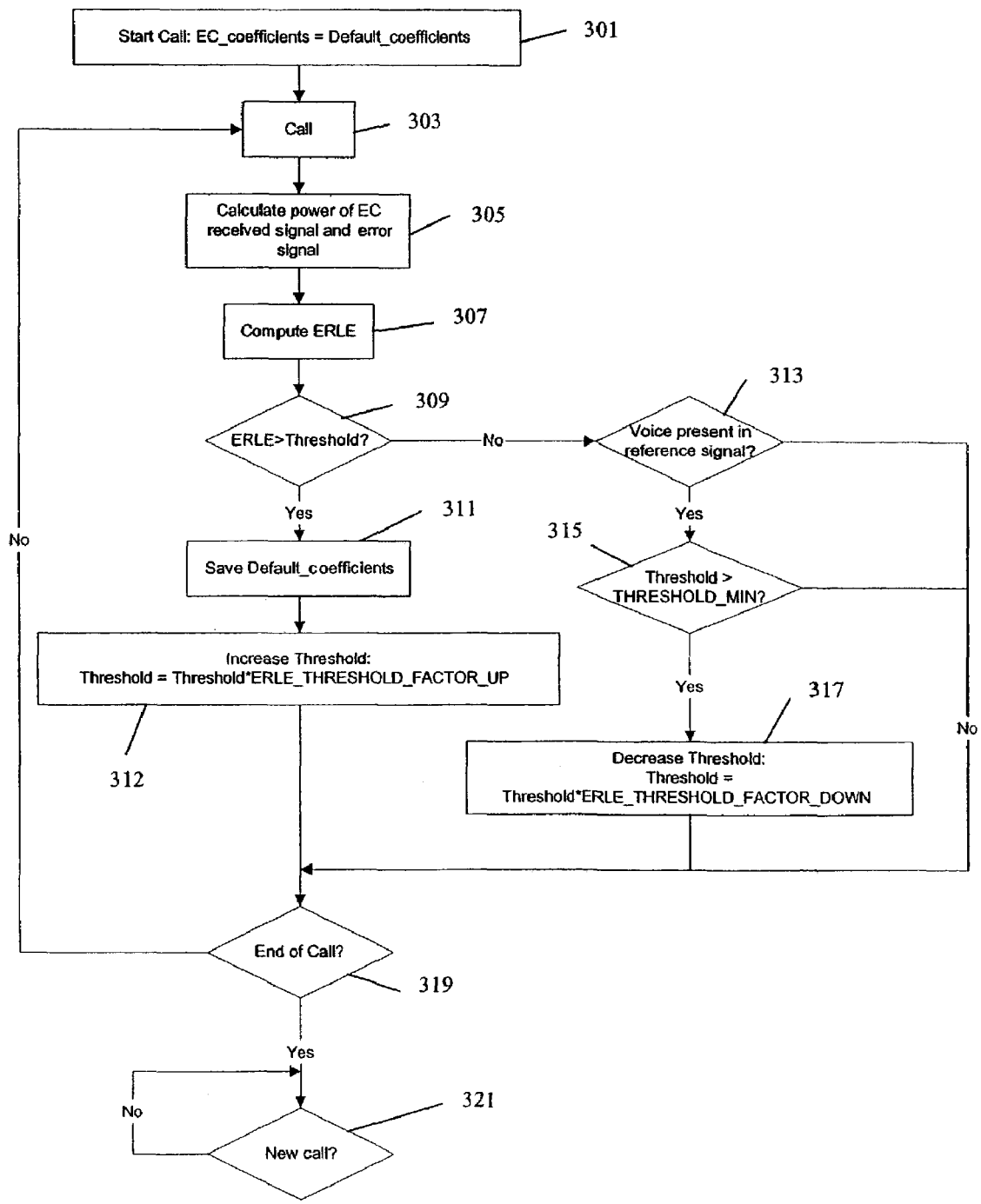
FIG. 3 is a block diagram showing an adaptive filter structure for implementing a method of triggering capture of coefficients according to the present invention.

As shown in FIG. 3, on power up of the speakerphone, the echo canceller is loaded with default coefficients (step 301). On commencement of a call (step 303), the power of the EC signal (i.e. LEC and/or AEC Received Signals in FIG. 1) and error signal (i.e. LEC Error and/or AEC Error in FIG. 1) are calculated. Next, at step 307, the ERLE is computed. The algorithm then determines (at step 309) whether ERLE>Threshold. If yes, the default coefficients are saved (step 311) and the Threshold is increased by an amount ERLE_THRESHOLD_FACTOR_UP (step 312). If no, the algorithm checks for voice in the reference signal (step 313). If voice is detected, then the algorithm determines whether Threshold>THRESHOLD_MIN (step 315). If it is, then Threshold is decreased by an amount ERLE_THRESHOLD_FACTOR_DOWN(step 317). After step 312, and if the determinations at either of steps 313 or 315 is "No", the algorithm then determines whether the "Call" has ended (step 319). If not, the process is repeated at step 303. Otherwise, if the "Call" has ended then the algorithm cycles until a new "Call" is initiated (step 321), whereupon the process is repeated at step 303.

The following are the values of constants and thresholds that were used in a successful implementation of the invention:

Sampling rate=8000 samples per second;

ERLE_THRESHOLD_FACTOR_DOWN=exp(−log (2)/(5*8000))=0.99998267147063, (resulting in a decrease of 3 dB every 5 seconds);

ERLE_THRESHOLD_FACTOR_UP=2, increase by 3 dB THRESHOLD_MIN=2^7=128 (21 dB, or 7 times increase of 3 dB)

Other embodiments and variations of the invention are possible. For example, as discussed above the method of capture and use of the echo canceller coefficients according to the present invention applies to improving the echo canceller performance not only for the new calls, but also to any system where the echo canceller has to deal with variations in the echo paths that are constant and repeatable for long intervals. When the EC resumes operation on an echo path that is characterized by a constant response that can be represented by the captured default coefficients, the method of the present invention may be used to capture the coefficients. For example, in a conferencing system (or a speakerphone) that uses directional microphones or beamforming to enhance quality of the near-end speech, the echo canceller default coefficients can be captured according to the method of this invention for each look direction. All such modifications and variations are possible within the sphere and scope of the invention as defined by the claims appended hereto.

The invention claimed is:

1. A method of operating an echo canceller which receives a reference signal and converges to an estimated echo signal of a received input signal via feedback of an error signal, said echo canceller being characterized by predetermined filter coefficients when converged, said method comprising the steps of:

a) detecting power levels of said received input signal and said error signal;

b) calculating an Echo Return Loss Enhancement value based on said power levels of said received input signal and said error signal, wherein said Echo Return Loss Enhancement value is expressed in decibels as ERLE(dB)=10 $\log_{10}$[Power(ReceivedSignal)/Power(ErrorSignal)]; and c) in the event said Echo Return Loss Enhancement value exceeds a threshold then storing said predetermined filter coefficients for subsequent use by said echo canceller, increasing said threshold by a predetermined factor and re-executing steps a) to c), and if said Echo Return Loss Enhancement value does not exceed the threshold, determining whether voice is present in said input signal and if so reducing said threshold by a predetermined factor and re-executing steps a) to c).

2. The method of claim 1, wherein said threshold is reduced only in the event said threshold exceeds a predetermined amount.

3. A use of the method according to claim 2 in a full duplex speakerphone, wherein said power levels of said received input signal and said error signal are detected during a call in progress, and said predetermined filter coefficients are stored for use by said echo canceller during calls subsequent to said call in progress.

4. A use of the method according to claim 3 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

5. A use of the method according to claim 2 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

6. The method of claim 1, wherein said threshold is increased by approximately 3 dB in the event said Echo Return Loss Enhancement value exceeds said threshold.

7. A use of the method according to claim 6 in a full duplex speakerphone, wherein said power levels of said received input signal and said error signal are detected during a call in progress, and said predetermined filter coefficients are stored for use by said echo canceller during calls subsequent to said call in progress.

8. A use of the method according to claim 7 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

9. A use of the method according to claim 6 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

10. The method of claim 1, wherein said threshold is decreased by approximately 3 dB every approximately 5 seconds in the event said Echo Return Loss Enhancement value does not exceed said threshold and voice is present in said input signal.

11. A use of the method according to claim 10 in a full duplex speakerphone, wherein said power levels of said received input signal and said error signal are detected during a call in progress, and said predetermined filter coefficients are stored for use by said echo canceller during calls subsequent to said call in progress.

12. A use of the method according to claim 11 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

13. A use of the method according to claim 10 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

14. The method of claim 1, wherein said threshold is at least approximately 21 dB.

15. A use of the method according to claim 14 in a full duplex speakerphone, wherein said power levels of said received input signal and said error signal are detected during a call in progress, and said predetermined filter coefficients are stored for use by said echo canceller during calls subsequent to said call in progress.

16. A use of the method according to claim 15 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

17. A use of the method according to claim 14 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

18. A use of the method according to claim 1 in a full duplex speakerphone, wherein said power levels of said received input signal and said error signal are detected during a call in progress, and said predetermined filter coefficients are stored for use by said echo canceller during calls subsequent to said call in progress.

19. A use of the method according to claim 18 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

20. A use of the method according to claim 1 in a conferencing system having multiple microphones in respective look directions under control of a beamformer, wherein said power levels of said received input signal and said error signal are detected for each of said look directions, and said predetermined filter coefficients are stored for use by said echo canceller in response to changes in said look directions.

21. The method of claim 1, wherein the threshold is maintained above a minimum value that is greater than zero.

* * * * *